United States Patent [19]

Banks et al.

[11] Patent Number: 5,185,533
[45] Date of Patent: Feb. 9, 1993

[54] MONITORING FILM FOULING IN A PROCESS STREAM WITH A TRANSPARENT SHUNT AND LIGHT DETECTING MEANS

[75] Inventors: Rodney H. Banks, Naperville; Robert J. Wetegrove, Winfield, both of Ill.

[73] Assignee: Nalco Chemical Company, Naperville, Ill.

[21] Appl. No.: 754,016

[22] Filed: Sep. 3, 1991

[51] Int. Cl.⁵ ............................................. G01N 15/06
[52] U.S. Cl. ................................. 250/575; 250/573; 250/301; 356/442
[58] Field of Search ............... 250/573, 574, 575, 576, 250/301, 373; 356/442, 441, 440

[56] References Cited
U.S. PATENT DOCUMENTS

| 3,731,091 | 5/1973 | Rosso et al. | 250/301 |
| 4,015,134 | 3/1977 | Sturm | 250/575 |
| 4,896,047 | 1/1990 | Weaver et al. | 250/573 |

Primary Examiner—David C. Nelms
Attorney, Agent, or Firm—Kinzer, Plyer, Dorn, McEachran & Jambor

[57] ABSTRACT

Method and apparatus for determining accumulated film thickness at the inside diameter of a main stream conduit conducting a main stream of a flowing fluid by employing:
- a transparent shunt conduit to shunt from the main stream a sample stream of the process fluid,
- a reference light emitter and light detector at a reference section of the shunt where any appreciable film is removed, an upstream sample light emitter and detector opposed thereto,
- a common source of light so that respective emitters emit light beams of the same intensity, and means for determining concurrently analogs of light received by the detectors, whereby film thickness may be determined for the sample.

9 Claims, 5 Drawing Sheets

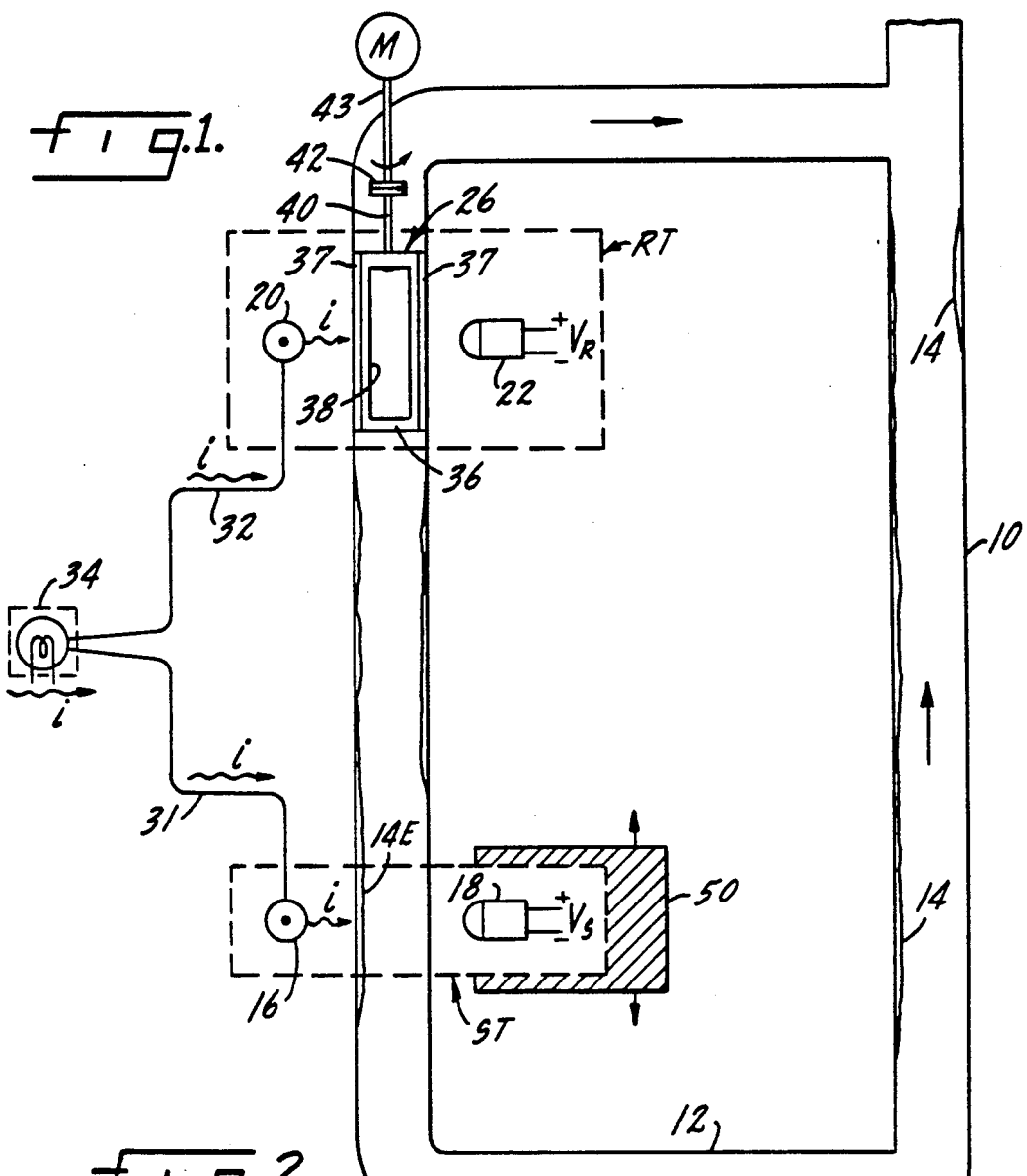
Fig. 1.
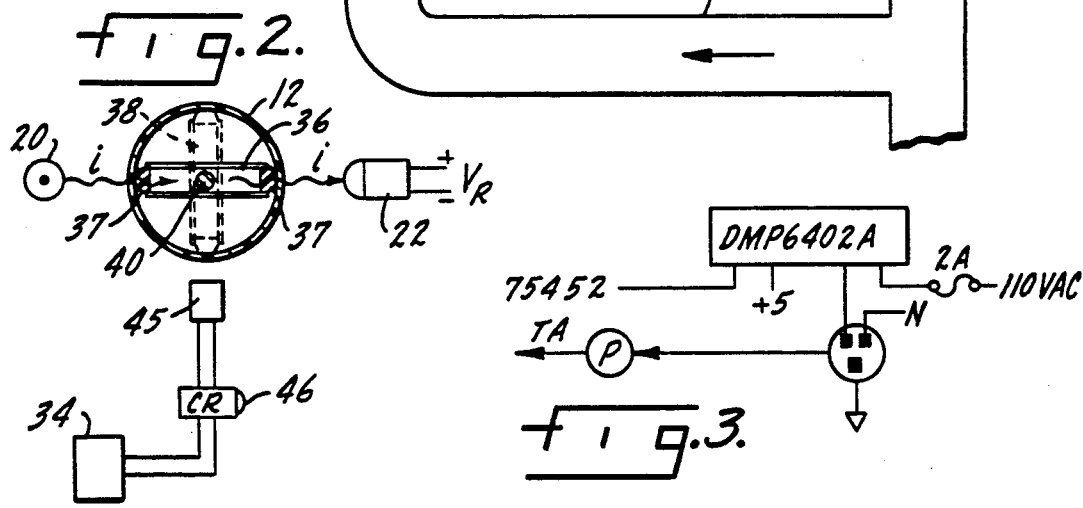
Fig. 2.
Fig. 3.

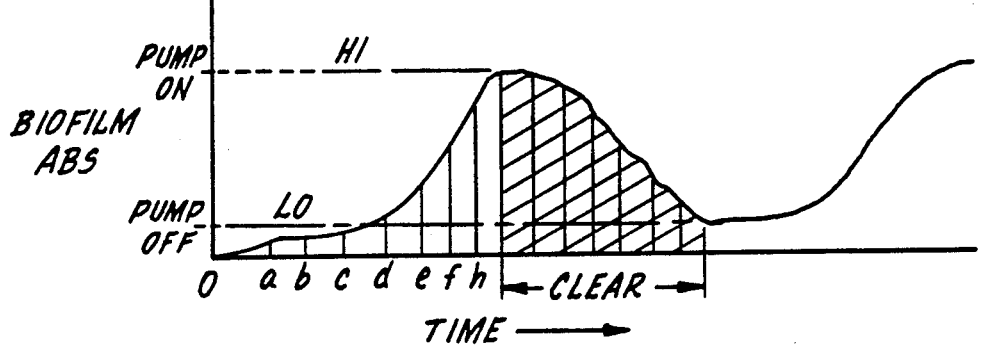
Fig. 4.
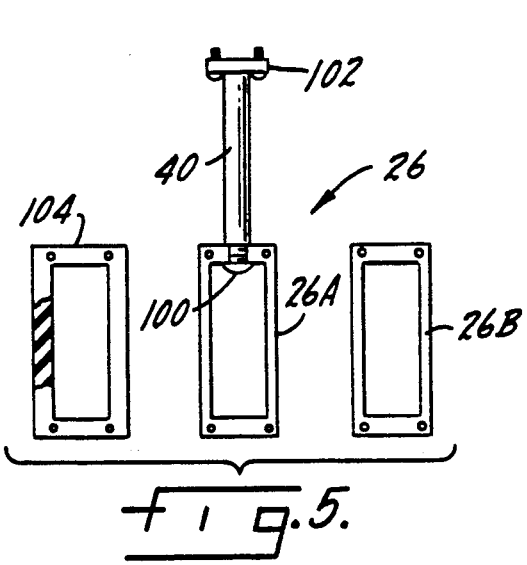
Fig. 5.
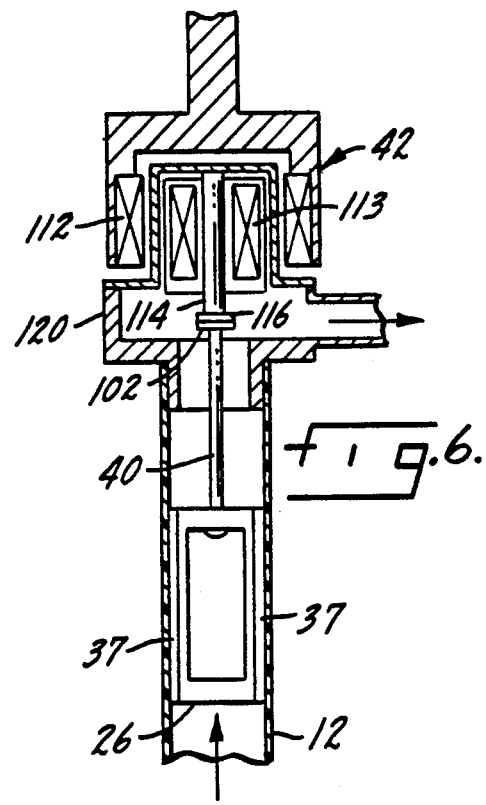
Fig. 6.
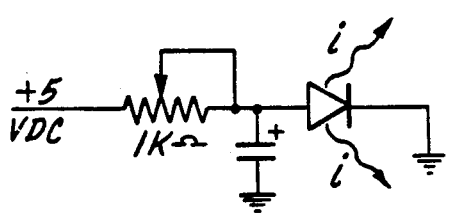
Fig. 7. (EMITTER)
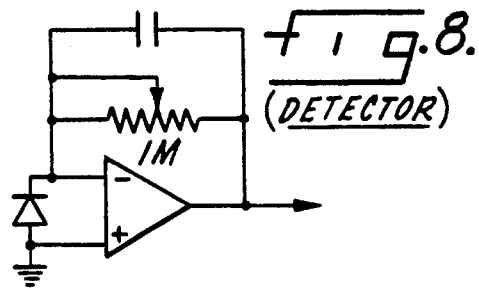
Fig. 8. (DETECTOR)

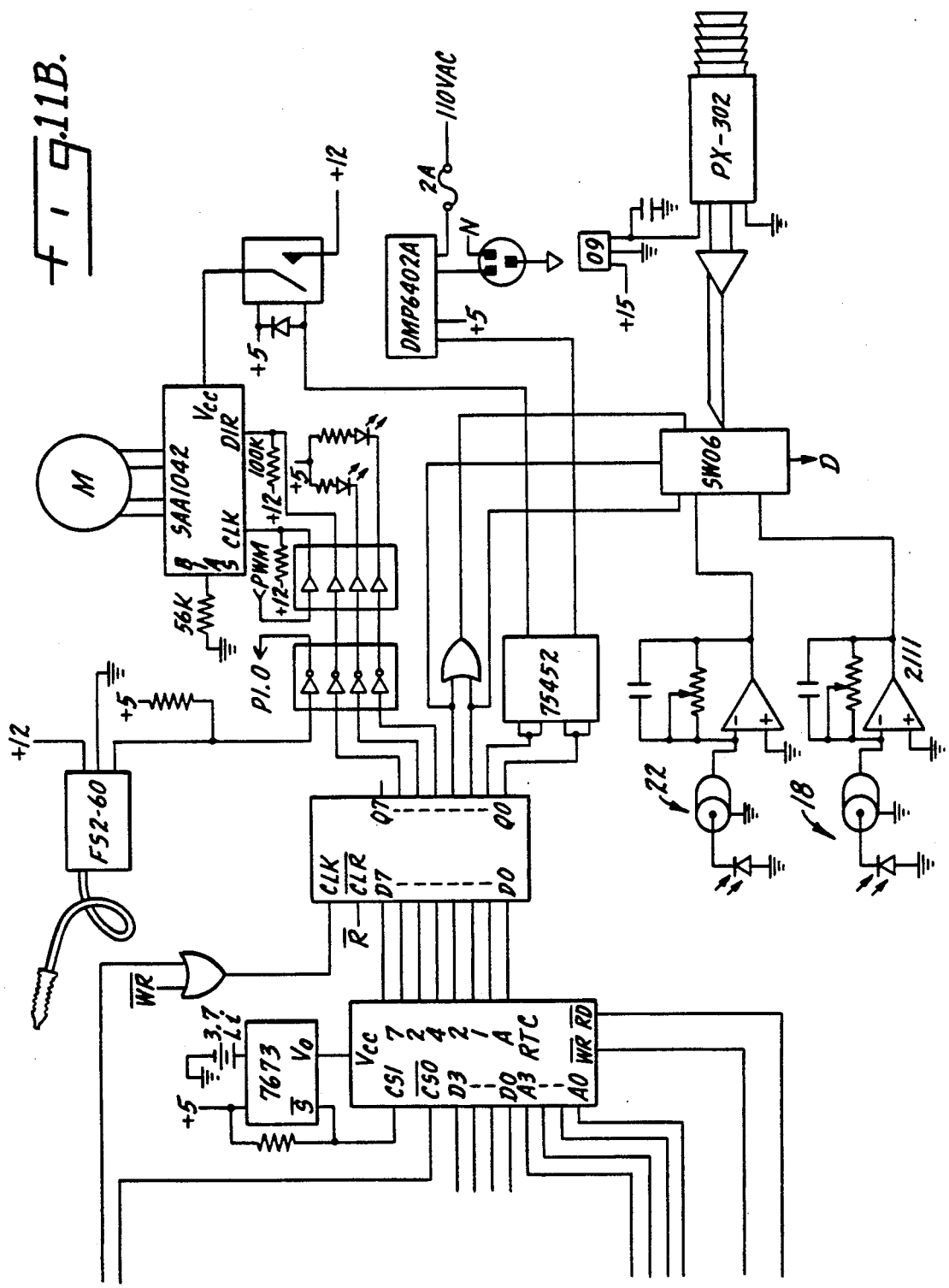

MONITORING FILM FOULING IN A PROCESS STREAM WITH A TRANSPARENT SHUNT AND LIGHT DETECTING MEANS

FIELD OF THE INVENTION

This invention relates to apparatus and method for measuring the thickness of adverse or inimical film accumulations inside a pipe or other conduit conducting a stream of substantially transparent fluid which contains the precursors of the film.

Heat exchange tubing for a water cooling tower is an example where detection of an unwanted film on the walls of the internal surfaces of the tubing is of value from an information standpoint. The film may be due to microorganisms and their products with or without other organic and mineral contents. The film grows in thickness, reducing the efficiency of heat transfer from the hot interior to the cooler ambient environment.

There are numerous other examples. The fluid may be water, but it could be natural gas in a transmission line. The film, as noted, may be due to primitive life forms (biological), but the film could also include trapped inorganics.

SUMMARY OF THE INVENTION

The present invention in part is embodied in instrumentation that measures light transmittance of a clear or substantially transparent fluid flowing through a transparent plastic pipe containing a by-pass (shunted) sample of the flowing process fluid. Using a double beam optical method, the transmittance values for reference and test sections of the pipe give a relative indication of the degree of fouling or film thickness in the pipe and process equipment being monitored. The test section is a short length of the pipe about which a light source and detector are situated. The reference section is similar to the test section, but in addition includes a wiper or other cleaner means that maintains the inner wall clean and unfouled.

Unlike other known devices for measuring or detecting a film thickness on the interior of a pipe or conduit (e.g. U.S. Pat. No. 4,912,332), this invention offers several advantages due to the double beam method and mechanical wiper. By maintaining a clean tube surface in the reference section, complete compensation for fluid color and turbidity, light source intensity drift and temperature effects are realized. The color or turbidity effects are particularly troublesome, especially during chemical treatment when films are dislodged and carried off in the process stream.

Since process tube fouling is known to be irregular or spotty, different areas of the test pipe can be examined, unlike that of other devices. This provides fouling information that is more representative of the process equipment being monitored.

In addition to the above specific advantages, the present invention offers microprocessor control of the wiper, performs the mathematical transformation of the transmittance data, stores data for later retrieval by modem or computer, and provides for operator interface via an LCD terminal.

PRIOR ART

U.S. Pat. No. 4,912,332 is the best we are aware of, and the differences compared thereto will be apparent from the description to follow.

BRIEF DESCRIPTION OF THE DRAWINGS

FIG. 1 presents a partly diagrammatic, partly schematic embodiment of the invention;

FIG. 2 is a schematic view of the wiper and its control;

FIG. 3 is a diagram of a control system;

FIG. 4 is a chart showing accumulated values of absorbance measurements;

FIG. 5 is an assembly view of the wiper;

FIG. 6 is a schematic view of the motor driven magnetic drive for the wiper;

FIG. 7 shows the circuitry for the reference and sample light emitters;

FIG. 8 illustrates the circuitry for the reference and sample light detectors;

FIGS. 11A and 11B are schematic views of the monitor circuitry.

GENERAL DESCRIPTION

Figure 10:
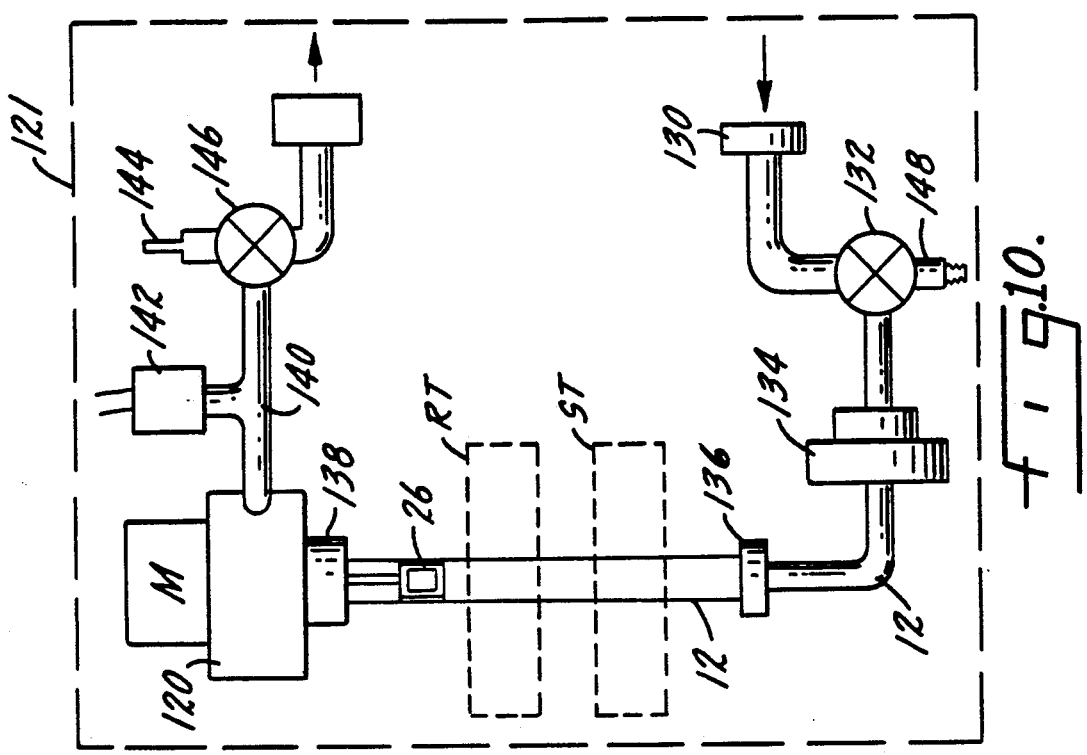
FIG. 10 is a more detailed but somewhat schematic view of the interior of the monitor housing.

A partly diagrammatic and partly schematic embodiment of the invention is shown in FIG. 1. A main stream of fluid (bold arrow) flows through a pipe or conduit 10 which may be, for example, a section of the heat exchanger of a water cooling tower. In accordance with the present invention a section of transparent piping or tubing 12 is coupled in shunt relation to the main process pipe and is employed to conduct a by-pass diversion sample of the fluid in the main stream. Pipe 12 may be a transparent acrylic, for example.

While the main stream pipe will ordinarily be metallic (e.g. steel), the transparent shunt pipe will accumulate the same kind of film as the main stream pipe. Thus, films of foreign matter 14 may collect on the inside diameter of the pipe 10 and become unacceptably thick in the course of time. The film may interfere with heat transfer, it may cause turbulence, and it may have other unacceptable results. Chemicals are available for removing such films, and the present invention is concerned with sensing or searching for equivalent film formations 14E on the inside diameter of the by-pass pipe or conduit 12. Such films will weaken the intensity of a light beam passed therethrough. Thus, the presence or even quantification of a film 14E accumulated inside the transparent pipe 12 may be determined by directing light from an emitter 16 transversely of the pipe, through the film thickness, to be detected as to its emergent intensity by an opposed detector 18 capable of emitting a voltage analog equivalent $V_S$ to the intensity of the light which it detects or receives. The emitter 16 and detector 18 as a couple are termed the sample transducer ST, emitting a voltage signal $V_S$ which is the analog of the weakened amount of light from source 16 due to the intervening film 14E.

In accordance with the present invention, a second, reference transducer RT is located downstream to the sample transducer ST, and again, a light emitter 20 is opposed to a light detector 22, the latter emitting a voltage analog $V_R$. This voltage analog, however, will be unperturbed or unaltered by any film thickness because the section of sampling pipe 12 traversed by the light beam emitted by emitter 20 is kept clean by a rotating wiper 26, but other means for cleaning may be used as will be explained.

In order to remove light drift as a possible factor, whereby both emitters 16 and 20 are concurrently self-calibrated to the same wavelength (e.g. infrared wavelength), emitters 16 and 20 are the ends, respectively, of a pair of split fiber-optic cables 31 and 32 communicating with a common light source (e.g. infrared source) 34. The sinuous arrows "i" in FIG. 1 are intended to show that the arrangement is such that the intensity of the sample light beam emitted by the emitter 16 and the intensity of the reference light beam at 20 at any point in time are identical.

A typical distance separating ST and RT would be about four inches.

To be certain the section of the sample pipe or by-pass line corresponding to the reference transducer couple RT is clean and free of any film, a rotating wiper 26 is employed. The wiper preferably is in the form of a rectangular (stainless steel) blade-like frame 36 which indeed would be comparable to a window frame since it presents a clear view window area 38.

In terms of construction, the wiper 26 is supported or connected to a spindle 40 rotated by a magnetic coupling 42 in turn rotated by the shaft 43 of a motor M.

Two opposed sides of the wiper frame 36 are faced with an effective wiper 37 of tough resin, such as a urea-formaldehyde resin, tetrafluorethylene resin or the like, to wipe clean the inside diameter of pipe section 12 where beam "i" passes. The wiper needs to be activated for a few turns just prior to a measurement. It is stopped in a neutral position when a measurement is to be made. In any event the reference transducer RT senses maximum light intensity, that is, the transmittance of light through the moving body of fluid constituting the sampled stream is unimpeded by any intervening film as 14E.

At the time a transmittance value $V_R$ is to be determined and compared to $V_S$, the wiper must be stopped in position to allow light to pass through the window 38. Referring to FIG. 2, this is the dashed line position for the wiper 36 where the plane of the window 38 is normal to the path of beam "i" emitted by light emitter 20.

To stop the wiper in the dashed line or neutral-stop position, FIG. 2, an optical reflective sensor 45 or other sensor (e.g. magnetic) may be actuated from a controller CR (manual push-button 46) to stop the wiper.

Of course it is possible to employ a microprocessor as the control CR, timed to intermittently stop the wiper 36 and make recordings of $V_R$ and $V_S$.

The wiper is to keep the reference section clean. We have shown the preferred embodiment, but equivalent structures, actuation and sensor-neutral-stop (CR, 46) are possible. Thus, by employing the wiper turbidity is factored out (turbidity would result in an absorbance value equivalent to a film thickness which is not there); by using a double beam of intensity "i" at both 16 and 20 there is no drift or bias which would indicate a film value that is not there.

It will be readily perceived from the foregoing that if a film as 14E is indeed present at the sampling section where the sampling transducer SR is located, then there is an interference with transmittance so that if the logarithms of the intensities detected respectively at 18 and 22 be compared, a determination of the absorbance of the interfering film at the inside diameter of the sampling section can be determined. Thus, $$\frac{\text{Sample voltage}}{\text{Reference voltage}} \times 100\% = \frac{V_S}{V_R} \times 100\% = \% \text{ transmittance} \quad \text{(Eq. 1)}$$

and $$\log (V_R/V_S) \text{ Absorbance} \quad \text{(Eq. 2)}$$

In summary, $$\log V_R - \log V_S = \text{biofilm absorbance} \quad \text{(Eq. 3)}$$

Each time a reading is to be made the reference section is cleaned. The biofilm absorbance, $\log V_R - \log V_S$ is a software calculation performed by a computer 80C52, FIG. 11. The computer activates a three-prong 110 VAC outlet via a solid state relay, DMP6402A, (FIG. 11) to which the pump is plugged. The absorbance value obtained represents the total biofilm absorbance (thickness) commencing with the beginning of the test (when a totally clean tube was installed). The pump feeds into the main stream a chemical TA (treating agent) intended to combat or eliminate the biofilm. The pump is controlled within an allowable HI, LO absorbance range set by the operator.

Figure 11A:
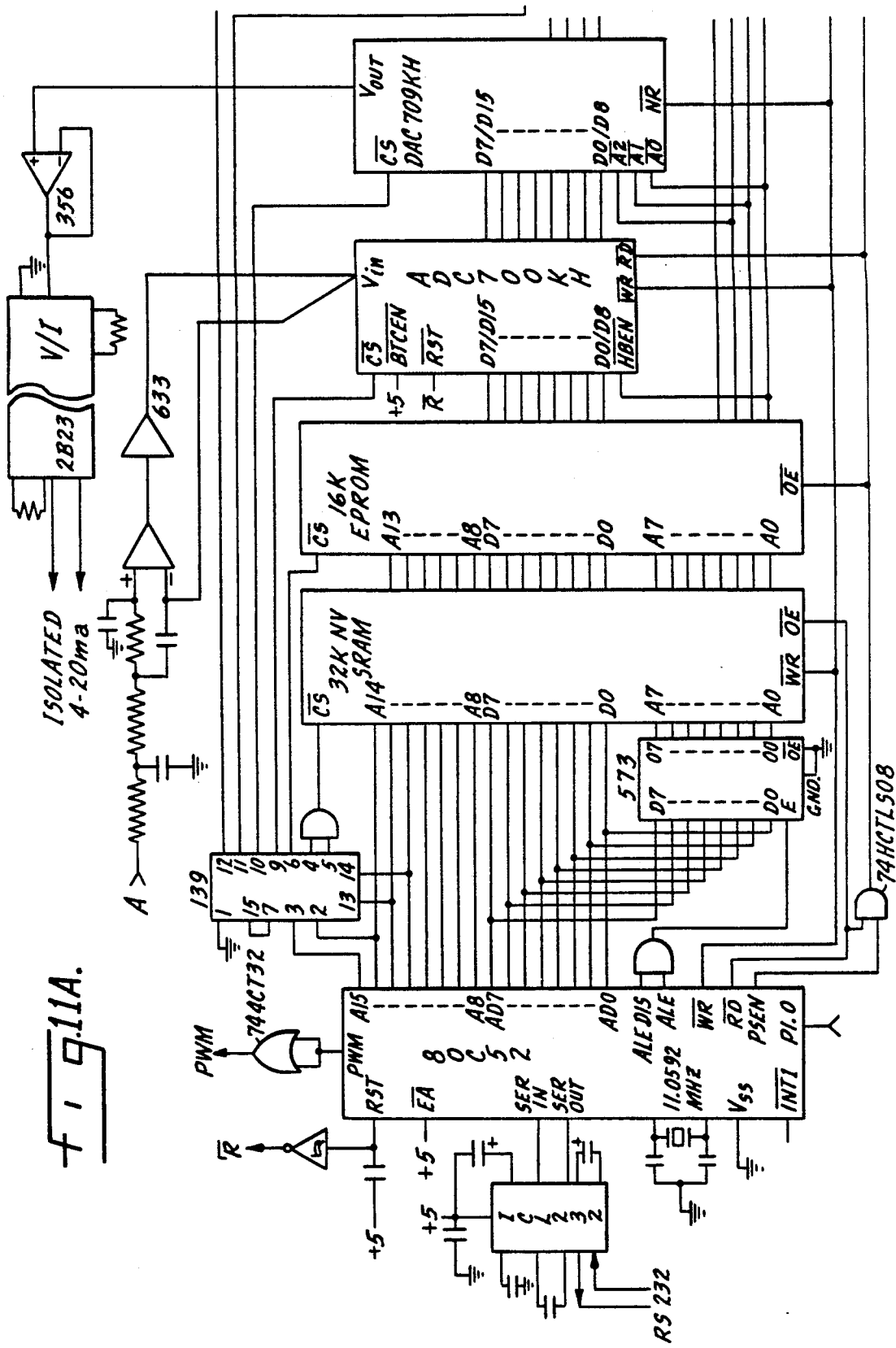

The computer also transmits to a device 2B23, FIG. 11, signals proportional to absorbance readings. The 4-20 ma output can be used to control a variable speed pump (instead of off-on pump as P) or to log or allow charting of absorbance readings. Readings can be displayed, RS232, FIG. 11.

The curve in FIG. 4 is intended to replicate a typical performance record commencing with employment of the rotating paddle or wiper 26 at the beginning of a test run to achieve an internal surface as clean as practical. At time zero nothing is recorded; there is no absorbance information. Readings are taken at times a, b, c and so on (e.g. under Eq. 3) resulting in biofilm absorbance values.

It is assumed, FIG. 4, that an intolerable film thickness corresponds to the "biofilm Abs" at time h. This in turn corresponds to the HI set point for pump P which is thereupon activated. The pump remains activated until an absorbance value corresponding to LO is obtained.

The sample transducer couple 16–18 may be supported by a movable fixture 50 whereby the sample transducer ST may be repositioned from time to time. Repositioning allowance may be several inches and allows various sections of the shunting pipe 12 to be sampled.

Of course the pump P could be feeding the chemical constantly at a slow rate and the pumping rate increased when the computer determines an Abs limit, FIG. 4. Therefore, whether "on" or "off", the pump rate is increased at the allowable Abs limit, and this rate is continued until the LO absorbance value is obtained indicating a relatively clean pipe, whereupon the pump rate is returned to normal which may be a "pump off" condition, FIG. 4.

At each point in time (a,b,c and so on, FIG. 4), the reference section is cleaned; the $V_R$ and $V_S$ values are measured and absorbance is calculated (resolved) as log $V_R$ – log $V_S$. Since log $V_R$ stays relatively constant the biofilm absorbance, FIG. 4, increases proportionately with biofilm thickness.

PREFERRED EMBODIMENT

In describing the preferred embodiment, like reference characters will be transferred from the disclosure presented above.

The wiper assembly 26, FIG. 5, includes two rectangular frames 26A and 26B, preferably of stainless steel secured by a screw 100 to the free end of the spindle 40 which is also preferably of stainless steel. The opposite end of the spindle includes a flange 102 enabling it to be bolted to another flange as will be disclosed.

The two frames 26A and 26B have openings at the corners for fastening screws, and before they are fastened together a like frame configuration 104 of wiper material (wider of course) is sandwiched between the two frames to present the wiper exposed surfaces 37 referred to above. To present an idea of dimensions, the spindle may have a diameter 0.15", the frames 26A and 26B may be 1 ¼" long and 178 " wide; the wiper frame may be a few thousandths of an inch wider made of rubber, felt, gasket material or a suitable resin or plastic resilient enough to seal against the inside diameter of the transparent sampling tube. As already explained, the rectangular open area presented by the assembled wiper is to allow the reference light beam to pass. Either a magnetic proximity or photoelectric reflective sensor (45) may be used to stop the wiper in the proper position when a reading is to be taken.

Coupling of the wiper 26 to the magnetic drive coupling 42, driven by motor M, is shown in FIG. 6. Motor M, FIG. 1, a stepping motor, steps a ring magnet 112, called the driver magnet, concentrically surrounding an inner circular drive magnet 113 to which a spindle 114 is secured. The spindle 114, FIG. 6, is provided with a flange 116 to which flange 102 is connected. Motor M, of which details are not necessary, is simply bolted to the housing 120 which encompasses the magnetic drive coupling. Activation of motor M to drive the wiper 26 is part of the microprocessor control. Sensor 45 tells the microprocessor to stop the wiper when a reading is to be made.

It will also be clear from FIGS. 1 and 6 that the (sealed) housing 120 for the magnetic drive assembly 42 is employed as part of the inlet-outlet path of the sampled process stream traversing pipe 12.

Each light source 16 and 20 is an infrared (890 nm) light emitting diode (LED), No. L2690 supplied by Hamamatsu, mounted in a fiber optic cable as disclosed above. The wavelength (890 nm) is chosen so that the water absorption band (960 nm) will not interfere. The circuit is shown in FIG. 7. The current can be adjusted by the trim potentiometer between ma and 3.6 ma, so the detector voltage will be scaled to 0–10 volts.

Each detector 18, 22 is a photodiode, preferably with a large light sensitive area. Preferred is S2281 series of Hamamatsu, having a sensitive area of about 100 mm$^2$. The circuitry is shown in FIG. 8 and it may be mentioned that a long wave filter (850 nm cut-off, not shown) is preferably placed in front of each photodiode to eliminate ambient light interference.

Figure 9:
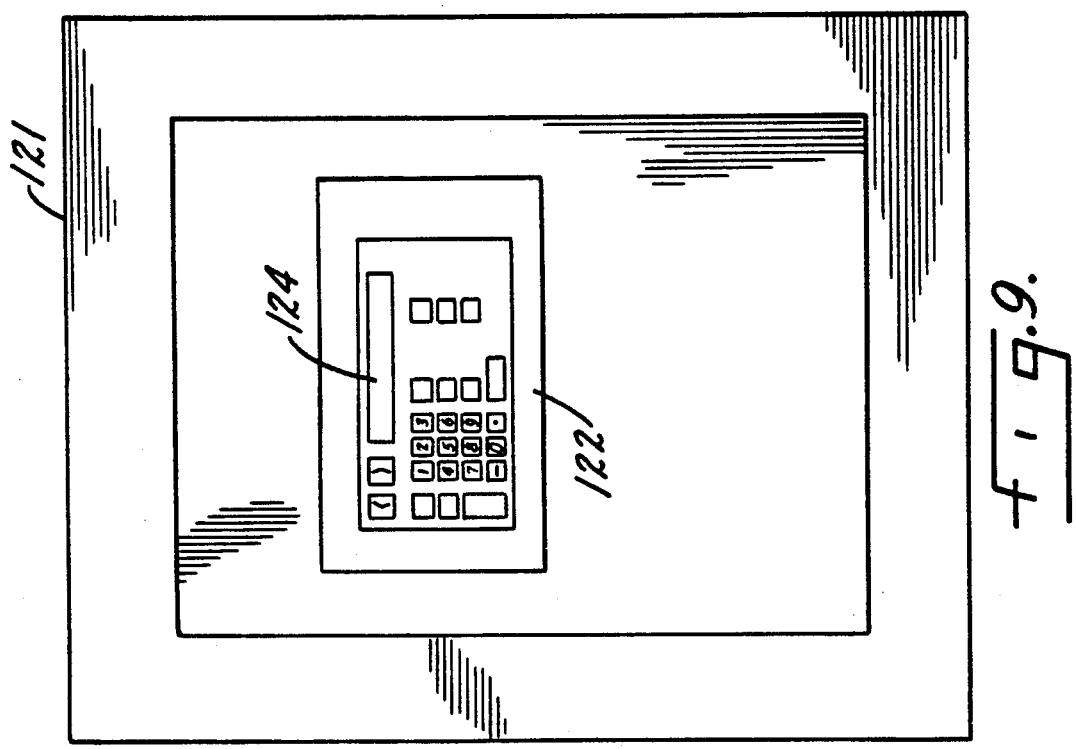
FIG. 9 is a front or facing view of the cabinet which houses the monitor equipment.

The entirety of the monitor is housed within a cabinet 120, FIG. 9. The door of the cabinet is provided with a Burr-Brown TM 2500 terminal 122 constituting the operator interface. This interface connects to RS232 terminals of the computer circuitry so that the absorbance readings, time and date will be visibly displayed at the screen 124. The numeric keyboard is used for entering set points, control points and so on. The six function keys allow the operator to enter the controlling parameters.

A more detailed but somewhat schematic view of the interior of the monitor housing is presented in FIG. 10, showing details of the pipe line connections, related valves and so on. Like reference characters previously employed are evident, including the transparent acrylic tube 12, the wiper 26, the reference transducer assembly RT, the sample transducer assembly ST, housing 120 for the magnetic drive to the wiper and the stepping motor M.

A quick disconnect 130 allows the sample flow from the main stream pipe 10 through a three-way valve 132 and from thence through a union 134 to the transparent pipe 12. Elbow fittings are not shown, and other fittings such as 136 and 138 need no elaboration.

As explained above, housing 120 embodies an outlet, 140, and a pressure transducer 142 at the outlet not only enables the system to be monitored for safety, but also to assure the monitor system is functioning on stream.

The pressure transducer is that of Omega Engineering, Model PXC302-100 GV having a range of 0–100 psig (0–90 mV).

An air inlet 144 is associated with a three-way valve 146 at this outlet connection. Pipe 12 can be drained by a hose connection, 148, at the other three-way valve.

A schematic of the microprocessor and related circuitry is shown in FIG. 11. The basic components of this electronic and comparator circuitry are:

CPU and associated components—(80C52)

16-bit A/D, D/A converters and V/I converter (ADC700, DAC709, 2B23)

Real time clock, calendar with battery back-up (72421A)
Stepper motor driver circuitry (SAA 1042)
Pressure transducer circuitry (PX-302)
Photodiode circuitry (OPA2111)
External 115VAC outlet control circuitry (DMP 6402A)
Photoreflective sensor circuitry (FS2-60)

It will be seen from the foregoing that in essence the monitor for film thickness may be activated at various times to take concurrent measures of $V_R$ and $V_S$ (voltage analogs), computing a voltage comparison for display, preferably log $V_R$ − log $V_S$ as the absorbance of the biofilm which is proportional to film thickness under Beer's Law.

Further, in essence, when the absorbance of the film obtains a predetermined maximum, a signal is emitted by the computer system corresponding to the HI set point of the pump controller whereupon the rate of feeding the treating agent to combat the film is increased, and this rate is continued until a value of Abs corresponding to the LO set point for the pump is reached at which time the pump is restored to normal, which as mentioned above, may be either an "off" condition or a condition whereat the treating agent is fed at some preset normal value. It will also be recognized that the monitor may be used to determine the rate at which film thicknesses build up under different circumstances, and such observations may be depended upon to adjust the pump controller accordingly to feed the treating agent at a greater or lower rate.

The rotary wiper or cleaner 26 can be substituted or replaced by other cleaners, depending upon the form of bacteria or other primitive life forms encountered.

Thus, if it is found that the film-formers are stringy or of long filamentary form tending to cling to the wiper means 26, a reciprocating tube equipped with an O-ring may be used, the O-ring acting as a scrubber on the walls of the by-pass tube.

The O-ring scrubber can be held in a retracted position, so the O-ring is free of the reference light beam when a measurement of $V_R$ is to be made.

Also, the film at the reference section may be removed by irradiation, if susceptible, using ultra-violet light or x-rays for example, or the reference section could be chemically scrubbed by jets of ozone or chlorine which will remove the film.

Thus, the reference section may be scrubbed, purged or scavenged in various ways to remove the film and establish a clean reference section when a measurement of $V_R$ is to be made. The term "scrubbed" or "scrubbing" is therefore employed in a generic sense to cover a mechanical scrubber which physically contacts the inside diameter of the by-pas or shunt tube at the reference section; or a chemical or radiant energy scrubber.

Hence, while the preferred embodiment of the invention has been disclosed, it will be recognized from the foregoing that equivalents may be employed such as substituting a light source other than infrared and other computations by which an analog of film thickness or rate of film formation is displayed or recorded.

We claim:

1. Method of determining accumulated film thickness at the inside diameter of a main stream conduit conducting a main stream of a flowing process fluid comprising the steps of:
    using a transparent shunt conduit to shunt from the mainstream a sample stream of the process fluid;
    locating a reference light emitter and light detector opposed thereto at a reference section of the shunt pipe and removing any appreciable film at the reference section to establish a clean reference section;
    locating adjacent the shunt pipe upstream of the reference section a sample light emitter and detector opposed thereto;
    connecting each emitter to a common source of light so the respective emitters emit a sample light beam and a reference light beam at the same intensity;
    measuring concurrently the voltage analog $V_S$ of light received by the sample detector and the voltage analog $V_R$ of light received by the reference detector at the clean section;
    repeatedly determining $\log V_R - \log VS$ as a measure of the absorbance (Abs) of the film at the sample section until a predetermined value of (Abs) is reached; and upon reaching said predetermined value feeding an anti-filming agent to the main stream at an increased rate to combat film formation.

2. Method according to claim 1 in which the sample emitter and detector are supported for movement back and forth along the length of the shunt conduit.

3. Method according to claim 1 in which voltage measurements $V_S$ and $V_R$ are repeatedly taken at different times and the feed rate of said agent is continued until an acceptable lower value of (Abs) is attained, and thereafter decreasing the rate at which said agent is fed.

4. Method of determining accumulated film thickness at the inside diameter of a main stream conduit conducting a main stream of a flowing fluid comprising the steps of:
    using a transparent shunt conduit to shunt from the mainstream a sample stream of the process fluid;
    locating a reference light emitter and light detector opposed thereto at a reference section of the shunt pipe and scrubbing any appreciable film at the reference section to establish a clean reference section;
    locating adjacent the shunt conduit upstream of the reference section a sample light emitter and detector opposed thereto on opposite sides of the shunt conduit;
    transmitting a beam of light concurrently to each emitter so the respective emitters emit a sample light beam and a reference light beam at the same intensity transversely through the conduit;
    measuring concurrently the voltage analog $V_S$ of light received by the sample detector and the voltage analog $V_R$ of light received by the reference detector at the clean section;
    determining $\log V_R - \log V_S$ as a measure of the absorbance (Abs) of the film at the sample section until a predetermined value of (Abs), indicative of an unacceptable film thickness, is reached; and
    upon reaching said predetermined value feeding an anti-filming agent to the main stream at an increased rate to combat film formation.

5. Method according to claim 4 in which voltage measurements $V_S$ and $V_R$ are repeatedly taken at different times and the feed rate of said agent is continued until an acceptable lower value of (Abs) is attained, and thereafter decreasing the rate at which said agent is fed.

6. Apparatus for determining accumulated film thickness at the inside diameter of a main stream conduit conducting a main stream of a flowing process fluid comprising:
    a transparent shunt conduit connected to the main stream conduit to shunt from the main stream a sample stream of the process fluid;
    a reference light emitter to transmit a light beam and a reference light detector opposed thereto at a reference section of the shunt pipe, and means for removing from the inside of the shunt pump any appreciable film at the reference section;
    means to measure the voltage analog $V_R$ of light received by said reference light detector;
    a sample light emitter to transmit a light beam and sample light detector opposed thereto at a sample section adjacent the shunt pipe upstream of the reference section;
    means to measure the voltage analog $V_S$ of light received by said sample detector;
    a source of light so connected to each emitter that the respective reference and sample light emitters emit respective light beams; and
    means to compare the difference between $V_R$ and $V_S$ as a measure of film thickness at the sample section.

7. Apparatus according to claim 6 in which the means to compare the difference between $V_R$ and $V_S$ computes $\log V_R - \log V_S$ as the absorbance (Abs) of the film at the sample section, and means to display the value of (Abs).

8. Apparatus according to claim 7 including a pump for feeding to the mainstream a treating agent to reduce film thickness and means to increase the pump rate when the value of (Abs) attains a predetermined limit.

9. Apparatus according to claim 6 in which there is a source of light common to both emitters.

* * * * *

UNITED STATES PATENT AND TRADEMARK OFFICE
CERTIFICATE OF CORRECTION

PATENT NO. : 5,185,533

DATED : FEBRUARY 9, 1993

INVENTOR(S) : RODNEY H. BANKS & ROBERT L. WETEGROVE

It is certified that error appears in the above-identified patent and that said Letters Patent is hereby corrected as shown below:

On title page, item [75]

"RODNEY H. BANKS & ROBERT J. WETEGROVE"

should read as follows;

--RODNEY H. BANKS & ROBERT L. WETEGROVE --

Signed and Sealed this

Sixteenth Day of November, 1993

Attest:

BRUCE LEHMAN

Attesting Officer

Commissioner of Patents and Trademarks